(12) United States Patent
Odell

(10) Patent No.: US 7,880,451 B2
(45) Date of Patent: *Feb. 1, 2011

(54) METHOD AND APPARATUS FOR POWER CONVERSION AND REGULATION

(75) Inventor: Arthur B. Odell, Cupertino, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/484,007

(22) Filed: Jun. 12, 2009

(65) Prior Publication Data

US 2009/0251116 A1    Oct. 8, 2009

Related U.S. Application Data

(63) Continuation of application No. 11/365,272, filed on Mar. 1, 2006, now Pat. No. 7,564,229.

(51) Int. Cl.
*G05F 1/10* (2006.01)
*G05F 1/652* (2006.01)

(52) U.S. Cl. .................. 323/267; 323/328; 323/222; 323/271; 307/38; 307/39; 307/41

(58) Field of Classification Search ............... 323/267, 323/328, 222, 271; 307/38, 39, 41
See application file for complete search history.

(56) References Cited

U.S. PATENT DOCUMENTS

| 3,735,240 A | 5/1973 | Davis et al. |
|---|---|---|
| 3,886,436 A | 5/1975 | Wadlington |
| 4,680,688 A | 7/1987 | Inou et al. |
| 4,740,878 A | 4/1988 | Carter et al. |

(Continued)

FOREIGN PATENT DOCUMENTS

DE    33 41 767 A1    5/1985

(Continued)

OTHER PUBLICATIONS

EP 09 16 5026—European Search Report and Written Opinion, dated Jan. 25, 2010, 6 pages.

(Continued)

*Primary Examiner*—Bao Q Vu
(74) *Attorney, Agent, or Firm*—Blakely Sokoloff Taylor & Zafman, LLP

(57) ABSTRACT

Techniques are disclosed to control a power converter with multiple output voltages. One example regulated power converter includes a an energy transfer element coupled between a power converter input and first and second power converter outputs. A switch is coupled between the power converter input and the energy transfer element such that switching of the switch causes a first output voltage to be generated at the first power converter output and a second output voltage to be generated at the second power converter output. A current in the energy transfer element is coupled to increase when a voltage across the energy transfer element is a difference between an input voltage at the power converter input and the first output voltage. The current in the energy transfer element is coupled to decrease when the voltage across the energy transfer element is a sum of the first and second output voltages.

15 Claims, 4 Drawing Sheets

U.S. PATENT DOCUMENTS

| | | | |
|---|---|---|---|
| 5,412,308 | A | 5/1995 | Brown |
| 5,532,577 | A | 7/1996 | Doluca |
| 5,552,695 | A | 9/1996 | Schwartz |
| 5,675,239 | A | 10/1997 | Kim et al. |
| 5,896,284 | A | 4/1999 | Murasato et al. |
| 6,075,295 | A | 6/2000 | Li |
| 6,222,352 | B1 | 4/2001 | Lenk |
| 6,650,095 | B2 | 11/2003 | Aiello et al. |
| 6,919,713 | B2 | 7/2005 | Hoshino et al. |
| 2002/0060875 | A1 | 5/2002 | Janz |
| 2002/0125864 | A1 | 9/2002 | Aiello et al. |
| 2005/0140350 | A1 | 6/2005 | Kitagawa et al. |
| 2007/0210764 | A1 | 9/2007 | Odell |
| 2008/0143309 | A1 | 6/2008 | Odell |

FOREIGN PATENT DOCUMENTS

| | | |
|---|---|---|
| EP | 1 830 458 A2 | 9/2007 |

OTHER PUBLICATIONS

EP 07 25 4481—European Search Report and Written Opinion, dated Mar. 10, 2008.

EP Search Report—Application No. EP 06 25 4828, dated Mar. 31, 2008.

Carl Nelson, "Dual Output Regulator Uses Only One Inductor," Linear Technology Design Notes, Design Note 100, Linear Technology Corporation, Mar. 1995, 2 pages.

Aiello, N. et al., "AN1514 Application Note, VIPower: Double Output Buck or Buck-Boost Converter Using VIPer12/22A", Feb. 2002, pp. 1-11.

Aiello, N. et al., "AN1374 Application Note, VIPower: Complementary Double Output Non Isolated Power Supply Based on VIPer12A", Apr. 2001, pp. 1-14.

Power Integrations, "LNK302/304-306 Link Switch®-TN Family, Lowest Component Count, Energy Efficient Off-Line Switcher IC", Mar. 2005, pp. 1-16.

Office Action mail date Feb. 12, 2009, U.S. Appl. No. 11/641,425, filed Dec. 18, 2006. (Publication No. 2008-0143309-A1).

Office Action mail date Oct. 10, 2007, U.S. Appl. No. 11/365,272, filed Mar. 1, 2006. (Publication No. 2007/0210764).

Office Action mail date Jun. 30, 2008, U.S. Appl. No. 11/365,272, filed Mar. 1, 2006. (Publication No. 2007/0210764).

Office Action mail date Jul. 6, 2009, U.S. Appl. No. 11/641,425, filed Dec. 18, 2006. (Publication No. 2008/0143309).

Office Action mail date Nov. 5, 2009, U.S. Appl. No. 11/641,425, filed Dec. 18, 2006 (Publication No. 2008/0143309).

US 7,880,451 B2

METHOD AND APPARATUS FOR POWER CONVERSION AND REGULATION

REFERENCE TO RELATED APPLICATION

The present application is a continuation of U.S. patent application Ser. No. 11/365,272, filed Mar. 1, 2006, entitled "METHOD AND APPARATUS FOR POWER CONVERSION AND REGULATION IN A POWER CONVERTER HAVING A PLURITY OF OUTPUTS," which is hereby incorporated by reference.

BACKGROUND OF THE INVENTION

1. Technical Field

The present invention relates generally to electronic circuits, and more specifically, the invention relates to circuits in which there is power regulation.

2. Background Information

Electrical devices need power to operate. Many electrical devices are powered using switched mode power converters. Some switched mode power converters are designed to provide multiple output voltages. One challenge with power converters of this type is to provide positive and negative DC output voltages. Known power converters of this type often rely on fixed values of Zener diodes to set the output voltages, which increases costs and limits the flexibility of such power converters.

BRIEF DESCRIPTION OF THE DRAWINGS

The present invention detailed illustrated by way of example and not limitation in the accompanying Figures.

DETAILED DESCRIPTION

Figure 1:
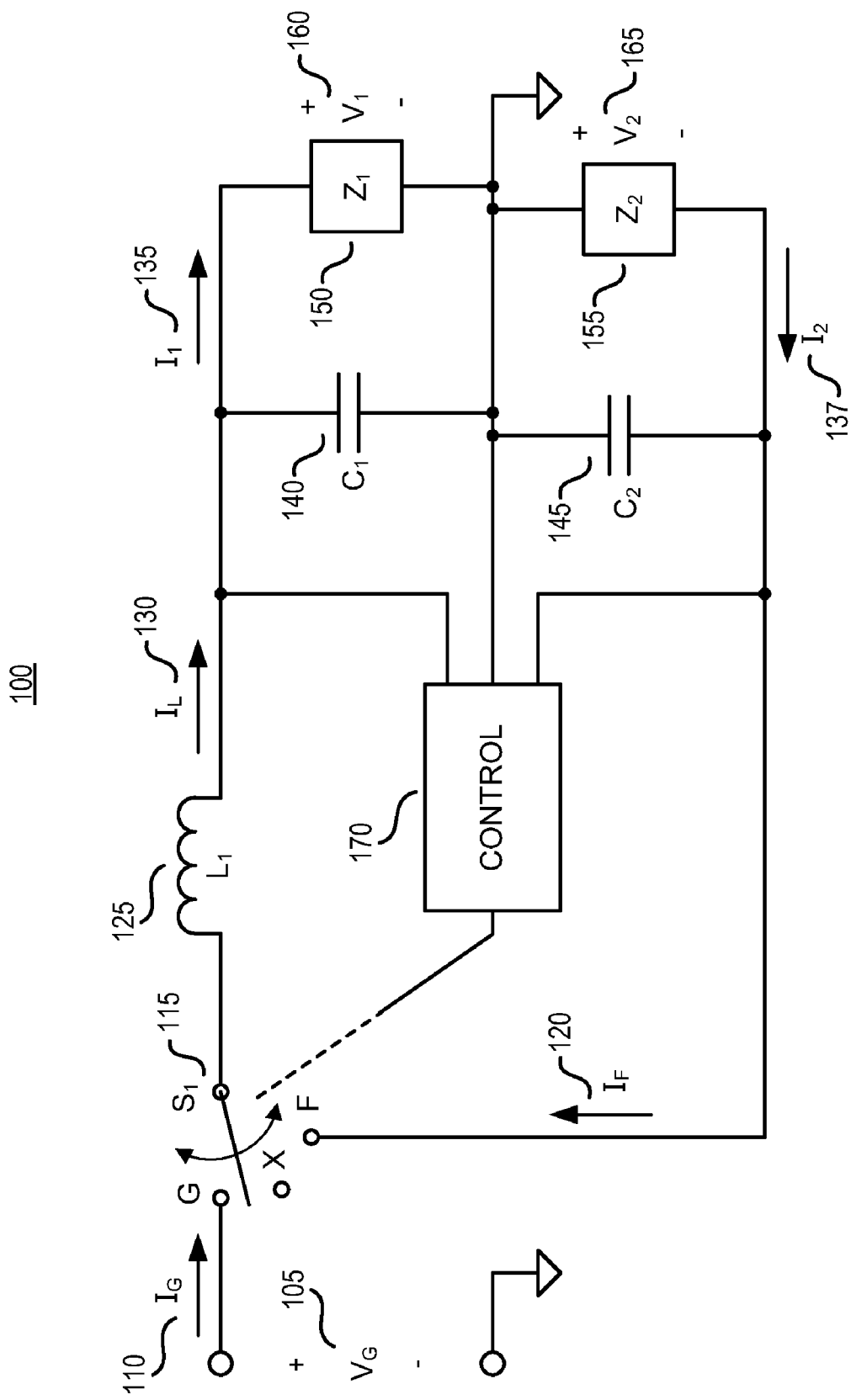
FIG. 1 is a schematic that shows generally an example functional block diagram of a switching regulator with a positive and a negative output referenced to an input return in accordance with the teaching of the present invention.

Examples related to power supply regulators are disclosed. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment" or "an embodiment" means that a particular feature, structure, or characteristic described in connection with the embodiment is included in at least one embodiment of the present invention. Thus, the appearances of the phrases "for one embodiment" or "in an embodiment" in various places throughout this specification are not necessarily all referring to the same embodiment. Furthermore, the particular features, structures, characteristics, combinations and/or sub-combinations described below and/or shown in the drawings may be combined in any suitable manner in one or more embodiments in accordance with the teachings of the present invention.

As will be discussed, some example power supply regulators in accordance with the teachings of the present invention utilize switched mode power conversion that provide two output voltages of opposite polarity with respect to a common reference that is the input return. Examples of the disclosed power supply regulators may be used in a variety of applications in which positive and negative direct current (DC) output voltages are provided from a higher input voltage without an isolation transformer. The example methods disclosed can provide two regulated output voltages at lower costs than other known methods. More flexibility is provided by the disclosed power supply regulators and methods in the selection of output voltages than by other known methods that rely on fixed values of Zener diodes to set output voltages. Some target applications for the disclosed power supply regulator and methods are those that do not require galvanic isolation between input and output, such as power supplies for major household appliances.

To illustrate, FIG. 1 is a functional block diagram that shows an example generalized power converter or switching regulator 100 in accordance with the teachings of the present invention with a positive and a negative output 160 and 165, respectively, referenced to the input return. As shown, a DC input voltage $V_G$ 105 is coupled to switch $S_1$ 115, which is controlled by control circuit 170. In the various examples, control circuit 170 includes circuitry to employ any of a variety of switching techniques including at least one of a constant frequency pulse width modulation (PWM), variable frequency PWM, on/off control or the like. An energy transfer element, which is illustrated as inductor $L_1$ 125, is coupled between switch $S_1$ 115 and the outputs of the regulator circuit 100. In the illustrated example, the outputs are shown as output voltage $V_1$ 160 across load impedance $Z_1$ 150 and output voltage $V_2$ 165 across load impedance $Z_2$ 155. Capacitor $C_1$ 140 is illustrated as being coupled across load impedance $Z_1$ 150 and capacitor $C_2$ 145 is illustrated as being coupled across load impedance $Z_2$ 155. As shown in the illustrated example of FIG. 1, the outputs are each coupled to a ground terminal coupled to both load impedance $Z_1$ 150 and load impedance $Z_2$ 155.

In operation, DC input voltage $V_G$ 105 is converted to output voltage $V_1$ 160 across load impedance $Z_1$ 150 and output voltage $V_2$ 165 across load impedance $Z_2$ 155 by the action or switching of switch $S_1$ 115 in response to a control circuit 170. In the illustrated example, control circuit 170 causes switch $S_1$ 115 to switch among three positions. When switch $S_1$ 115 is in position G, the current $I_L$ 130 in inductor $L_1$ 125 is the same as the input current $I_G$ 110 supplied from the input voltage $V_G$ 105. When switch $S_1$ 115 is in position F, the current $I_L$ 130 in inductor $L_1$ 125 is the same as freewheeling current $I_F$ 120 derived from an output of the power converter as shown. When switch $S_1$ 115 is in position X, the current $I_L$ 130 in inductor $L_1$ 125 is zero. In the illustrated example, control circuit 170 switches switch $S_1$ 115 between positions G, X, and F with sequence and durations to regulate one output. In one mode of operation, (continuous conduction mode) the switch $S_1$ 115 spends no time at position X. The single regulated output may be $V_1$ 160, $V_2$ 165, or a combination of both.

In operation, the switching of switch $S_1$ 115 produces currents $I_L$ 130, $I_G$ 110, and $I_F$ 120 that contain triangular or trapezoidal components. Capacitors C1 140 and C2 145 filter currents $I_L$ 130 and $I_F$ 120 respectively, which produce the respective DC output voltages $V_1$ 160 and $V_2$ 165 that have small alternating current (AC) variations relative to their DC values. Load impedances $Z_1$ 150 and $Z_2$ 155 produce load currents $I_1$ 135 and $I_2$ 137 from the respective output voltages $V_1$ 160 and $V_2$ 165.

For the regulator of FIG. 1, switch $S_1$ 115 may be controlled to regulate only a single output voltage. The other output voltage will change with load currents $I_1$ 135 and $I_2$ 137. To regulate more than one output voltage requires a current regulator to regulate current $I_1$ 135 or $I_2$ 137 in response to changes in output voltages $V_1$ 160 and $V_2$ 165. In the illustrated example, control circuit 170 is shown having three inputs including an input coupled to an end of load impedance $Z_1$ 150, an input coupled to an end of load impedance $Z_2$ 155 and an input coupled to a ground terminal.

In one example of the power converter or power supply regulator 100, control circuit 170 is not included or is instead adapted to switch $S_1$ 115 in a fixed pattern, which produces unregulated output voltages $V_1$ 160 and $V_2$ 165. In this example, current $I_L$ 130 through inductor $L_1$ 125 increases when the voltage across inductor $L_1$ 125 is the difference between the input voltage $V_G$ 105 and output voltage $V_1$ 160, which is what occurs when switch $S_1$ 115 is in position G. Continuing with this example, the current $I_L$ 130 through inductor $L_1$ 125 decreases when the voltage across inductor $L_1$ 125 is the sum of output voltage $V_1$ 160 and output voltage $V_2$ 165, which is what occurs when switch $S_1$ 115 is in position F.

Figure 2:
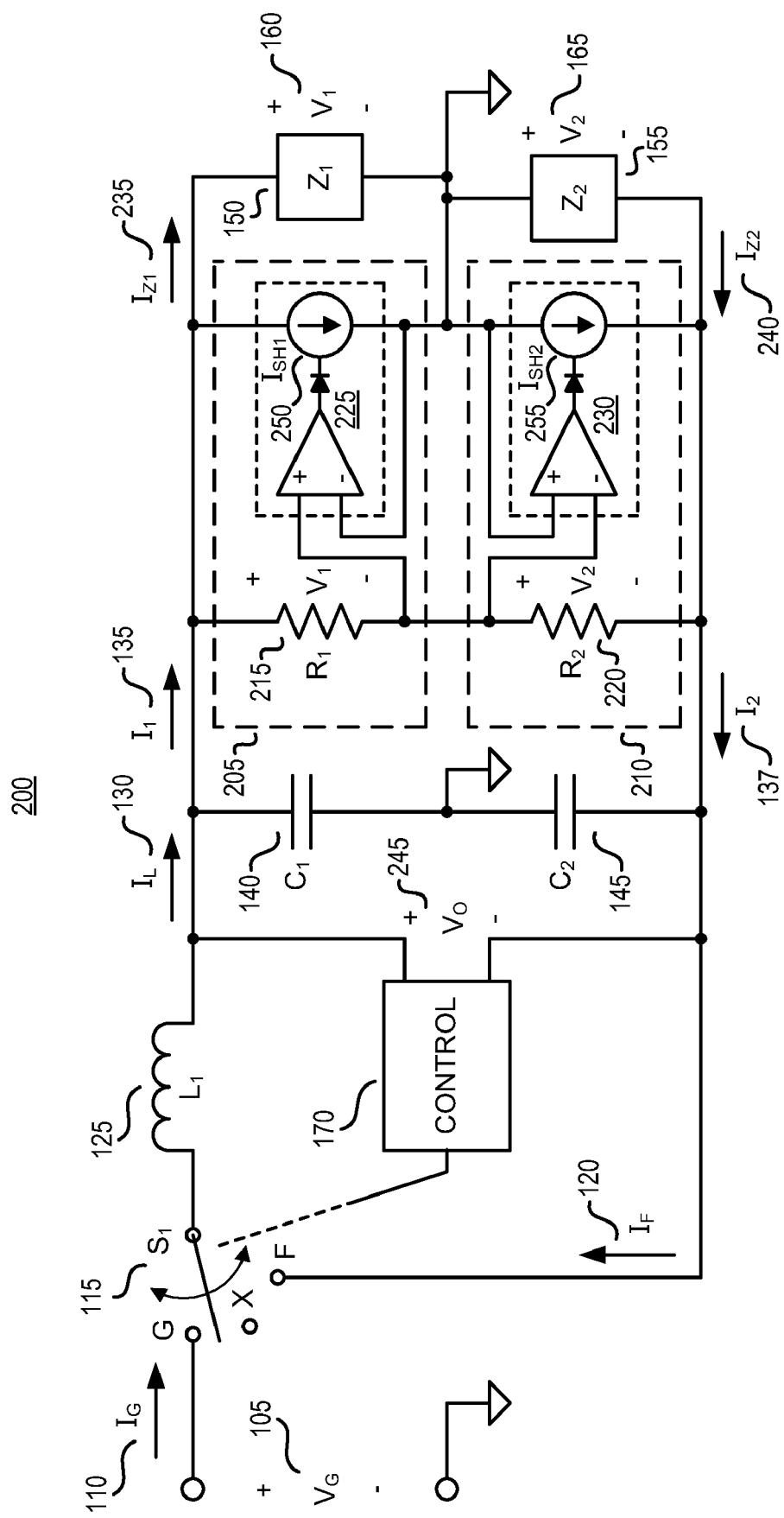
FIG. 2 is a schematic that shows generally example shunt regulators that independently regulate currents in response to changes in output currents to maintain desired output voltages included in an example regulator in accordance with the teaching of the present invention.

FIG. 2 shows generally a power converter or power supply regulator 200, which includes shunt regulators 205 and 210 coupled across load impedances $Z_1$ 150 and $Z_2$ 155, respectively. In the illustrated example, shunt regulators 205 and 210 independently regulate currents $I_1$ 135 and $I_2$ 137 in response to changes in output currents $I_{Z1}$ 235 and $I_{Z2}$ 240 to maintain the desired output voltages in accordance with the teachings of the present invention. In various examples, only one of shunt regulators 205 or 210 may be necessary depending how load impedances $Z_1$ 150 and $Z_2$ 155 might change. In operation, shunt regulators 205 or 210 only add to the current in the loads if the load impedances Z1 150 or Z2 155 are insufficient to maintain the desired output voltage. In the example shown in FIG. 2, power supply 200 includes power supply regulator 100 of FIG. 1 with the addition of shunt regulators 205 and 210. As shown in FIG. 2, control circuit 170 switches switch $S_1$ 115 to regulate an output voltage $V_O$ 245, which is the sum of $V_1$ 160 and $V_2$ 165.

In the illustrated example, the ratio of voltages $V_1$ 160 and $V_2$ 165 is determined by the ratio of resistors $R_1$ 215 and $R_2$ 220 that are included in respective shunt regulators 205 and 210. Transconductance amplifiers 225 and 230 are included in shunt regulators 205 and 210, respectively, and produce unidirectional current from current sources $I_{SH1}$ 250 and $I_{SH2}$ 255 at their respective outputs to regulate voltages $V_1$ 160 and $V_2$ 165 across load impedances $Z_1$ 150 and $Z_2$ 155. In operation, if there is a change in load to cause a decrease in either load current $I_{Z1}$ 235 or $I_{Z2}$ 240, the control circuit will modify the switching of switch $S_1$ to maintain the value of output voltage $V_O$ 245 in accordance with the teachings of the present invention. Then current sources $I_{SH1}$ or $I_{SH2}$, respectively, will increase to maintain output voltages $V_1$ 160 and $V_2$ 165 at the values determined by the ratio of resistors $R_1$ 215 and $R_2$ 220. In various examples, one or more of shunt regulators 205 and 210 are included in an integrated circuit.

Figure 3:
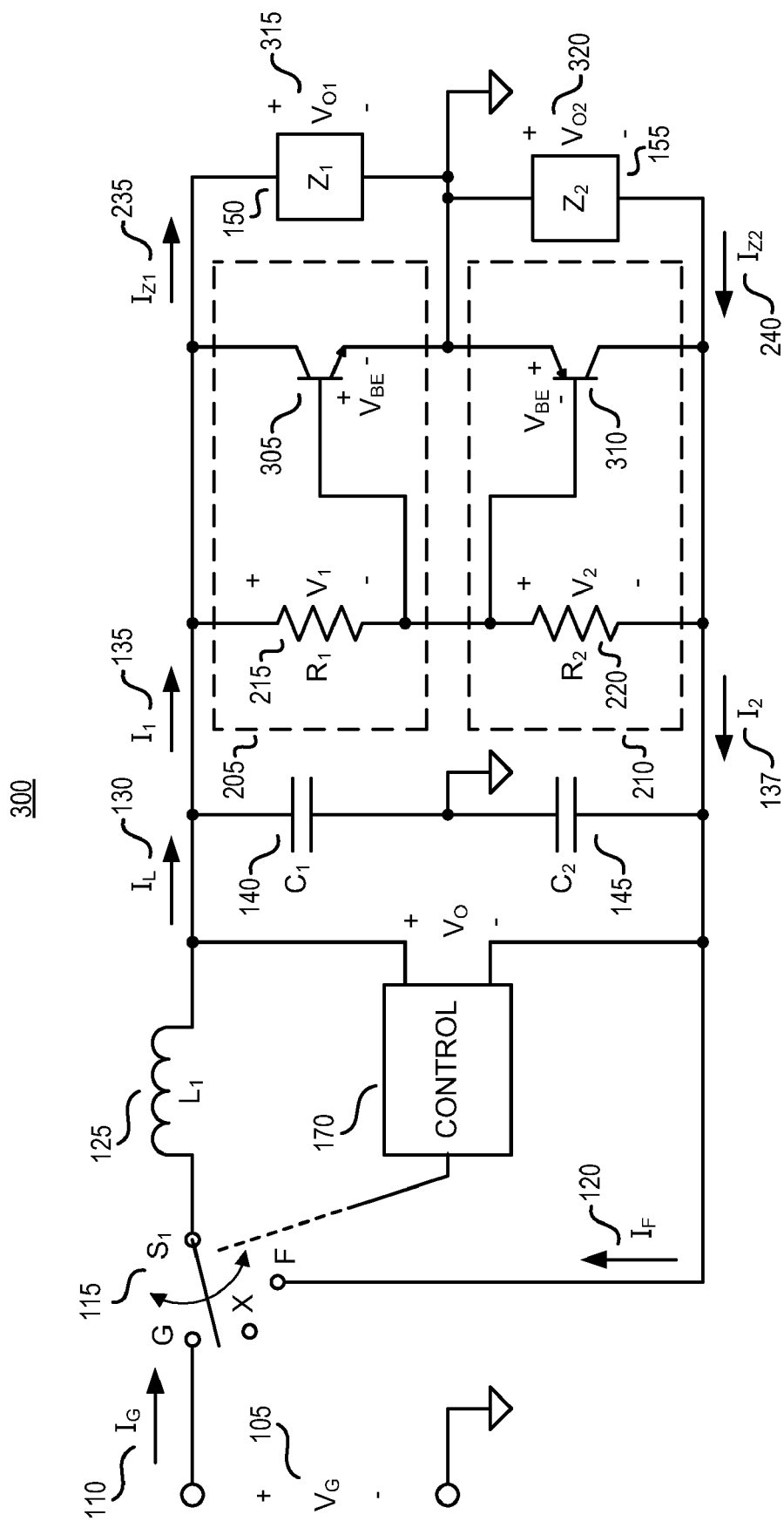
FIG. 3 is a schematic that shows generally example shunt regulators included in an example regulator in accordance with the teaching of the present invention.

FIG. 3 shows generally one example of shunt regulators 205 and 210 of FIG. 2 included in a power converter or power supply regulator 300 in accordance with the teachings of the present invention. In the illustrated example, shunt regulator 205 includes resistor $R_1$ 215 and bipolar transistor 305 while shunt regulator 210 includes resistor $R_2$ 220 and bipolar transistor 310. In one example, transistors 305 and 310 have a finite base to emitter voltage $V_{BE}$ that causes the output voltages $V_{O1}$ 315 and $V_{O2}$ 320 to differ from the desired regulated values of $V_1$ and $V_2$ by no more than $V_{BE}$. In the example of FIG. 3, the regulation of $V_{O1}$ and $V_{O2}$ is described by the expressions:

$$(V_1-V_{BE}) \leq V_{O1} \leq (V_1+V_{BE})$$

$$(V_2-V_{BE}) \leq V_{O2} \leq (V_2+V_{BE})$$

and $$V_{O1}+V_{O2}=V_1+V_2=V_O$$

Therefore, the nonzero value of $V_{BE}$ in the circuit of FIG. 3 prevents the transistors from conducting simultaneously in accordance with the teachings of the present invention.

In the example illustrated in FIG. 3, it is appreciated that bipolar transistors 305 and 310 are illustrated as including single transistors. However it is appreciated that the teachings of the present invention are not limited to single transistors and that additional transistors or other circuit elements may be added to bipolar transistors 305 and 310 as appropriate such as for example Darlington transistor pairs or the like to realize the desired circuit performance in accordance with the teachings of the present invention. In addition, it is noted that the example illustrated in FIG. 3 shows both bipolar transistors 305 and 310 included. However, in another example, it is noted that either bipolar transistor 305 or 310 may be eliminated if changes to the respective load do not demand current from both shunt regulators 205 and 210.

Figure 4:
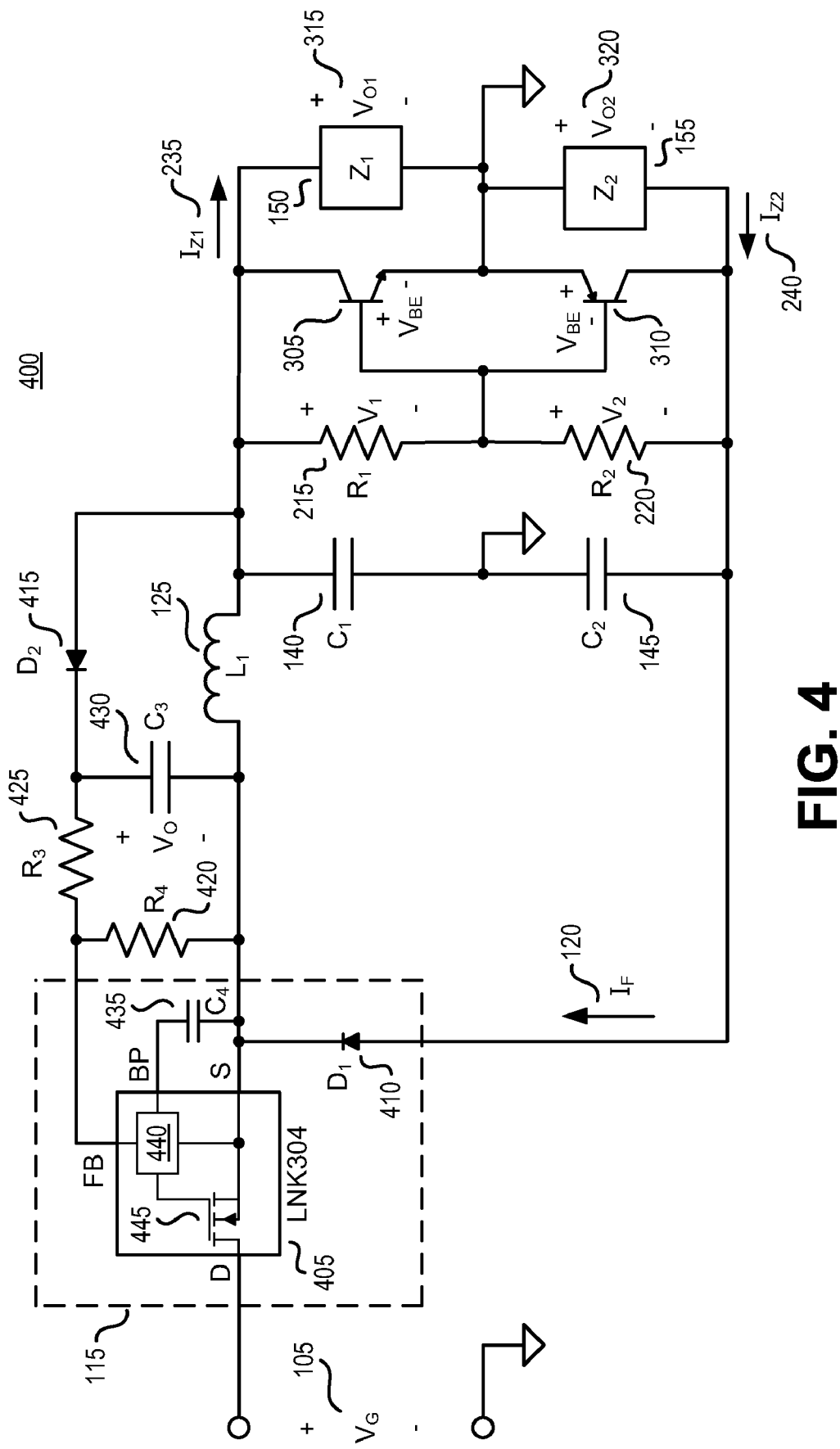
FIG. 4 is a schematic that shows generally an example regulator circuit in accordance with the teaching of the present invention.

FIG. 4 is one example schematic showing generally the power converter or regulator circuit of FIG. 3 with increased detail. In particular, the example of FIG. 4 shows switch $S_1$ 115 including a diode $D_1$ 410 and a transistor 445, which are included in an integrated circuit 405 with a control circuit 440. In the illustrated example, integrated circuit 405 may be a LNK304 produced by Power Integrations, Inc. of San Jose, Calif. In the illustrated example, integrated circuit 405 is coupled between the DC input voltage $V_G$ 105 and the inductor $L_1$ 125. In another example, integrated circuit 405 is not included and transistor 445 is therefore a discrete metal oxide semiconductor (MOSFET) or bipolar transistor and control circuit 440 is a separate controller in accordance with the teachings of the present invention. Capacitor $C_4$ 435 is a bypass capacitor coupled to the BP terminal of integrated circuit 405 for the operation of integrated circuit 405. In the illustrated example, control circuit 440 receives a signal proportional to the output voltage $V_O$ that is on capacitor $C_3$ 430. Capacitor $C_3$ charges to approximately the sum of output voltages $V_{O1}$ 315 and $V_{O2}$ 320 when diode $D_1$ 410 in switch 115 conducts the freewheeling current $I_F$ 120. In operation, diode $D_1$ 410 automatically configures the switch $S_1$ 115 to position F when the diode $D_1$ 410 is conducting and to position G or X when the diode $D_1$ 410 is not conducting.

In the foregoing detailed description, the methods and apparatuses of the present invention have been described with reference to a specific exemplary embodiment thereof. It will, however, be evident that various modifications and changes may be made thereto without departing from the broader spirit and scope of the present invention. The present specification and figures are accordingly to be regarded as illustrative rather than restrictive.

What is claimed is:

1. A power converter, comprising:
   an energy transfer element coupled between a power converter input and first and second power converter outputs;
   a switch coupled between the power converter input and the energy transfer element such that switching of the switch causes a first voltage to be generated at the first power converter output and a second voltage to be generated at the second power converter output;
   a control circuit coupled to the switch to control switching of the switch to regulate an output voltage in response to a signal received at a terminal of the control circuit, wherein the signal is proportional to a sum of the first and second voltages; and
   a first shunt regulator coupled to the first power converter output, wherein the first shunt regulator regulates the first voltage.

2. The power converter of claim 1, wherein the energy transfer element comprises an inductor coupled between the power converter input and the first and second power converter outputs.

3. The power converter of claim 1, further comprising:
   a first capacitor coupled across the first power converter output; and
   a second capacitor coupled across the second power converter output.

4. The power converter of claim 1, wherein the first power converter output and the second power converter output are coupled to a ground terminal.

5. The power converter of claim 1, wherein the output voltage is the sum of the first voltage and the second voltage.

6. The power converter of claim 1, further comprising:
   a first load impedance coupled across the first power converter output, such that the first voltage is across the first load impedance; and
   a second load impedance coupled across the second power converter output such that the second voltage is across the second load impedance.

7. The power converter of claim 6, wherein the first shunt regulator manages current through the first load impedance.

8. The power converter of claim 1, wherein the first shunt regulator further comprises:
   a resistance coupled to the first power converter output; and
   a unidirectional transconductance amplifier coupled to the resistance and the first power converter output, wherein the unidirectional transconductance amplifier is adapted to add unidirectional current at the first power converter output when a first load impedance to be coupled across the first power converter output is insufficient to maintain the first voltage.

9. The power converter of claim 1, wherein the first shunt regulator further comprises:
   a resistance coupled to the first power converter output; and
   a transistor coupled to the resistance and across the first power converter output to conduct a shunt current to maintain the first voltage.

10. The power converter of claim 1, further comprising a second shunt regulator coupled to the second power converter output, wherein the second shunt regulator regulates the second voltage.

11. The power converter of claim 10, further comprising:
    a first load impedance coupled across the first power converter output, such that the first voltage is across the first load impedance; and
    a second load impedance coupled across the second power converter output such that the second voltage is across the second load impedance, wherein the first shunt regulator manages current through the first load impedance and the second shunt regulator manages current through the second load impedance.

12. The power converter of claim 10, wherein the first shunt regulator further comprises a first resistance and the second shunt regulator further comprises a second resistance coupled to the first resistance, wherein a ratio between the first resistance and the second resistance determines a ratio between the first voltage and the second voltage.

13. The power converter of claim 1, wherein the control circuit includes circuitry to employ at least one of constant frequency pulse width modulation (PWM), variable frequency PWM, or on/off control.

14. The power converter of claim 1, further comprising a capacitor coupled to charge to a voltage approximately equal to the sum of the first and second voltages, wherein the signal received at the terminal of the control circuit is generated in response to the voltage on the capacitor.

15. The power converter of claim 14, wherein the capacitor includes a terminal coupled to the switch and another terminal coupled between the first power converter output and the terminal of the control circuit.

* * * * *